United States Patent
Mora et al.

(10) Patent No.: US 8,728,430 B2
(45) Date of Patent: May 20, 2014

(54) LOW TEMPERATURE SINGLE-WALL CARBON NANOTUBE SYNTHESIS

(75) Inventors: Elena Mora, Lewis Center, OH (US); John M. Pigos, Lewis Center, OH (US); Avetik R. Harutyunyan, Upper Arlington, OH (US)

(73) Assignee: Honda Motor Co., Ltd., Tokyo (JP)

(*) Notice: Subject to any disclaimer, the term of this patent is extended or adjusted under 35 U.S.C. 154(b) by 1279 days.

(21) Appl. No.: 12/487,324

(22) Filed: Jun. 18, 2009

(65) Prior Publication Data

US 2013/0259795 A1    Oct. 3, 2013

Related U.S. Application Data

(60) Provisional application No. 61/073,792, filed on Jun. 19, 2008.

(51) Int. Cl.
  *D01F 9/12*    (2006.01)

(52) U.S. Cl.
  USPC ............. 423/447.3; 423/447.1; 977/742; 977/843

(58) Field of Classification Search
  USPC ............ 423/447.3, 447.1, 447.2, 445 B; 977/742–754, 842–848
  See application file for complete search history.

(56) References Cited

U.S. PATENT DOCUMENTS

| | | |
|---|---|---|
| 3,985,639 A | 10/1976 | Suggitt et al. |
| 4,013,546 A | 3/1977 | Suggitt et al. |
| 4,111,840 A | 9/1978 | Best |
| 4,402,869 A | 9/1983 | Tauster et al. |
| 4,855,267 A | 8/1989 | Cheng |
| 5,356,845 A | 10/1994 | Clavenna et al. |
| RE37,789 E | 7/2002 | Bertus et al. |
| 6,413,487 B1* | 7/2002 | Resasco et al. ............ 423/447.3 |
| RE37,842 E | 9/2002 | Bertus et al. |
| 7,108,804 B2 | 9/2006 | Lu et al. |
| 7,214,359 B2 | 5/2007 | Ohtsubo et al. |
| 2004/0091416 A1* | 5/2004 | Harutyunyan et al. .... 423/447.3 |
| 2004/0150312 A1 | 8/2004 | McElrath et al. |
| 2004/0266608 A1 | 12/2004 | Long et al. |
| 2005/0002851 A1* | 1/2005 | McElrath et al. ......... 423/447.3 |
| 2008/0131351 A1 | 6/2008 | Wang et al. |
| 2008/0131602 A1 | 6/2008 | Wang et al. |
| 2010/0266478 A1 | 10/2010 | Kim et al. |

FOREIGN PATENT DOCUMENTS

| | | |
|---|---|---|
| JP | 11139815 A | 5/1999 |
| JP | 2007-145674 A | 6/2007 |
| WO | 03/057955 A1 | 7/2003 |
| WO | 2007/092021 A2 | 8/2007 |

OTHER PUBLICATIONS

Peigney, et al., Carbon Nanotubes-Fe—Alumina Nanocomposites. Part I: Influence of the Fe Content on the Synthesis of Powders, Journal of the European Ceramic Society 1998; 18(14): 1995-2004.*

(Continued)

*Primary Examiner* — Daniel C McCracken
(74) *Attorney, Agent, or Firm* — Capitol City TechLaw, PLLC; Mark E. Duell

(57) ABSTRACT

The present disclosure is directed to a method for producing SWCNT from endothermic carbon-containing feedstock, such as, methane gas, using an activated alumina supported Fe:Mo catalyst. The SWCNT growth temperature is less than about 560° C., and the catalyst is activated by exposure to a reducing atmosphere at a temperature greater than about 900° C.

16 Claims, 3 Drawing Sheets

(56) References Cited

OTHER PUBLICATIONS

Bae, et al., Low-Temperature Growth of Single-Walled Carbon Nanotubes by Plasma Enhanced Chemical Vapor Deposition, Chem. Mater. 2005; 17: 5141-5145.*

Peigney, et al., Carbon nanotubes-Fe—alumina nanocomposites. Part II: microstructure and mechanical properties of the hot-Pressed composites, Journal of the European Ceramic Society 1998; 18(14): 2005-2013.*

Mora, et al., Low-Temperature Single-Wall Carbon Nanotubes Synthesis: Feedstock Decompoistion Limited Growth, J. Am. Chem. Soc. 2008; 130: 11840-11841.*

Cantoro, et al., Catalytic Chemcial Vapor Deposition of Single-Wall Carbon Nanotubes at Low Temperatures, Nano Letters 2006; 6(6): 1107-1112.*

Finnie, P., Li-Pook-Than, A., Lefebvre, J., and Austing, D.G., "Optimization of methane cold wall chemical vapor deposition for the production of single walled carbon nanotubes and devices," Carbon, (Dec. 1, 2006), vol. 44, No. 15, pp. 3199-3206, Elsevier,Oxford, Great Britian.

Harutyunyan, A.R., Pradhan, B.K., Kim, U.J., Chen, G., and Eklund, P.C., "CVD Synthesis of Single Wall Carbon Nanotubes under "Soft" Conditions," Nanoletters, (Jan. 1, 2002), vol. 2, No. 5, pp. 525-530, ACS, Washington, DC, US.

Kim, S-M., Zhang, Y., Wang, X., Teo, KBK., Gangloff, L., Milne, W. I., Wu, J., Eastman, M., and Jiao, J.,"Low-temperature growth of single-wall carbon nanotubes," Nanotechnology, (Dec. 12, 2007), vol. 18, No. 49, p. 495606, IOP Publishing, Bristol, GB.

Bae, E.J., Min, Y-S., Kang, D., Ko, J-H., and Park, W., "Low-Temperature Growth of Single-Walled Carbon Nanotubes by Plasma Enhanced Chemical Vapor Deposition," Chem. Mater., (Sep. 7, 2005), vol. 17, No. 20, pp. 5141-5145, ACS, Washington, DC, US.

Mora, E., Pigos, J.M., Ding, F., Yakobson, B.I., and Harutyunyan, A.R., "Low-Tempearture Single-Wall Carbon Nanotubes Synthesis: Feedstock Decomposition Limited Growth," Journal of the American Chemical Society, Communications, (Aug. 16, 2008), vol. 130, pp. 11840-11841, ACS, Washington, DC, US.

International Search Report, corresponding PCT/US2009/047865 mailed Oct. 29, 2010, 4 pages.

Lamouroux, E., Serp, P., Kihn, Y. and Kalck, P., "Identification of key parameters for the selective growth of single or double wall carbon nanotubes on FeMo/Al2O3 CVD catalysts," Applied Catalysis A:General, (Feb. 22, 2007), vol. 323, pp. 162-173, Elsevier B.V.

* cited by examiner

US 8,728,430 B2

LOW TEMPERATURE SINGLE-WALL CARBON NANOTUBE SYNTHESIS

RELATED APPLICATIONS

The present application claims benefit from earlier filed U.S. Provisional Application No. 61/073,792, filed Jun. 19, 2008, which is incorporated herein in its entirety by reference for all purposes.

BACKGROUND

1. Field of the Invention

The present disclosure relates to methods for the synthesis of single-wall carbon nanotubes (hereinafter "SWCNT") at lower temperatures than previously reported for synthesis routes utilizing methane as the feedstock and Fe:Mo compositions as the catalyst.

Although significant progresses have been made in SWCNT synthesis, knowledge about the nucleation and/or growth mechanism, which could lead to type-selective growth and/or large scale production, is still very limited. Early on, it was believed that very high temperature conditions, for instance, 1000-2000° C., were necessary for SWCNT synthesis, since arc discharge and laser ablation methods were mainly used. With the advent of chemical vapor deposition (hereinafter "CVD") methods, this opinion changed, and the SWCNT growth temperatures keep decreasing.

2. Discussion of the Related Art

Maruyama et al. (Maruyama, S.; Kojima, R.; Miyauchi, Y.; Chiashi, S.; Kohno, M. *Chem. Phys. Lett.* 2002, 360, 229) reported SWCNT growth at 550° C. by using methanol as carbon feedstock and Fe/Co as catalyst. Bae et al. (Bae, E. J.; Min, Y-S.; Kang, D.; Ko, J-H.; Park, W. *Chem. Mater.* 2005, 17, 5141) reported synthesis at 400° C. by using a plasma enhanced CVD method; and recently Cantoro et al. (Cantoro, M.; Hofmann, S.; Pisana, S.; Scardaci, V.; Parvez, A.; Ducati, C.; Ferrari, A. C.; Blackburn, A. M.; Wang, K-Y.; Robertson, J. *Nano Lett.* 2006, 6, 1107) further reduced the synthesis temperature to 350° C. In most cases these reported synthetic routes utilized exothermic carbon-containing feedstocks.

Theoretical analysis and models indicate that there are three relatively independent stages for the growth of a SWCNT on a catalyst:

1) catalytic decomposition of carbon feedstock gas yielding C atoms, 2) diffusion of these C atoms to the tube end that is strongly attached to the catalyst surface, and 3) incorporation of the C into the tube wall. (Ding. F.; Larsson, P.; Larsson, J. A.; Ahuja, R.; Duan, H.; Rosén, A.; Bolton, K. *Nano Lett.* 2008, 8, 463, and Ding. F.; Rosén, A.; Bolton, K. *J. Phys. Chem. B* 2004, 108, 17369.)

Thermal activation is necessary for each one of these stages and thus, there must be a characteristic threshold temperature for each step. Therefore, we define:

$T_{dec}$ as the lowest temperature sufficient to decompose the feedstock;

$T_{diff}$ as the temperature above which the C atoms can diffuse to the SWCNT end at a reasonably high rate; and $T_g$ as the temperature at which C atoms can be readily incorporated into the tube wall.

While the interplay of these stages can be complex, the highest temperature of these three threshold temperatures should be the overall threshold temperature of the apparent SWCNT growth. Recent density functional calculations show that the diffusion barrier of a C atom on catalyst surface is only about 0.5 eV (for example, the diffusion barrier of a C atom on a Ni (111) surface) (Abild-Pedersen, F.; Nørskov, J. K.; Rostrup-Nielsen, J. R.; Sehested, J.; Helveg, S. *Phys. Rev. B* 2006, 73, 115419) so the $T_{diff}$ may be as low as room temperature. The feedstock decomposition temperature sensitivity appears to depend upon, at least, the type and size of the catalyst particle, the type of the chemical reaction, and the feedstock itself. Finally, incorporation of C atoms into the SWCNT is apparently feedstock independent, although presently this stage of the process is not well known, and is the subject of further investigation.

While it remains difficult to determine the dominant step influencing the SWCNT growth temperature, we note that the reported low temperature SWCNT growths were achieved in synthesis routes using active hydrocarbon sources with exothermic decomposition only (for instance, $C_2H_4 \rightarrow 2C+2H_2$ $\Delta H° = -38.2$ kJ/mol and $C_2H_2 \rightarrow 2C+H_2$, $\Delta H° = -224.3$ kJ/mol at 800° C.) (David R. Lide, ed. *CRC Handbook of Chemistry and Physics* (87th Edition); Taylor and Francis: Boca Raton, Fla., 2007) or with decomposition obtained with the assistance of plasma treatment of the feedstock. These results would seem to suggest that the decomposition of carbon feedstock limits SWCNT growth. If that is true, then the threshold temperature for SWCNT growth with less active endothermic carbon feedstock must be higher than the threshold temperature for SWCNT growth when more active exothermic carbon feedstock are utilized.

SUMMARY OF THE PRESENT DISCLOSURE

In the present teachings, we disclose methods for a low temperature process of SWCNT growth using endothermic decomposition of $CH_4$ gas. The observed growth temperature of 560° C. is higher than what was previously reported for exothermic carbon feedstocks. Our presently taught methods also indicate that the decomposition threshold temperature of $CH_4$ appears to be the limiting factor for SWCNT growth.

The present teachings are directed to a method of producing single-walled carbon nanotubes through providing a nanotube-producing catalyst composition and a reducing atmosphere, and contacting the nanotube-producing catalyst composition with the reducing atmosphere. The nanotube-producing catalyst composition and the reducing atmosphere are then heated to a first temperature, which can be greater than about 900° C. The temperature is then reduced to a second cooler temperature, and an endothermic carbon-containing feedstock is provided. The endothermic carbon-containing feedstock is then contacted with the nanotube-producing catalyst composition, and single-walled carbon nanotubes are produced.

Also disclosed by the present disclosure is a method of producing single-walled carbon nanotubes by providing both an Fe and Mo-containing catalyst composition supported on alumina and a reducing atmosphere, which is then contacted with the Fe and Mo-containing catalyst composition supported on alumina, and both are heated to a first temperature. The Fe and Mo-containing catalyst composition supported on alumina is then cooled to a second temperature, which is no greater than about 560° C. An endothermic carbon-containing feedstock is then provided and contacted with the Fe and Mo-containing catalyst composition supported on alumina, and single-walled carbon nanotubes are produced.

BRIEF DESCRIPTION OF THE DRAWINGS

The accompanying drawings which are included to provide a further understanding of the present disclosure and are incorporated in and constitute a part of this specification, illustrate various embodiments of the present disclosure and together with the detailed description serve to explain the principles of the present disclosure.

In the drawings.

DETAILED DESCRIPTION

Figure 1:
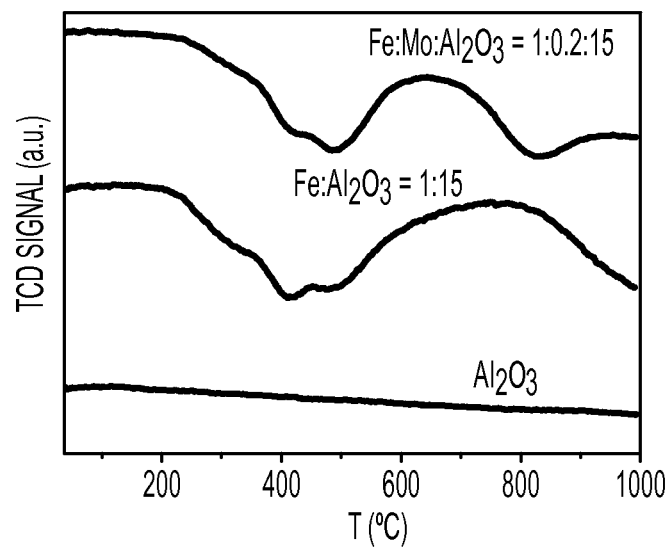
FIG. 1 is a graph of TPR profiles.

A method of producing single-walled carbon nanotubes through providing a nanotube-producing catalyst composition and a reducing atmosphere, and contacting the nanotube-producing catalyst composition with the reducing atmosphere is taught by the present disclosure. The nanotube-producing catalyst composition and the reducing atmosphere are then heated to a first temperature, which can be greater than about 900° C. The method includes the further steps of reducing the temperature to a second cooler temperature, and providing an endothermic carbon-containing feedstock. The endothermic carbon-containing feedstock is then contacted with the nanotube-producing catalyst composition, and single-walled carbon nanotubes are produced.

The presently taught method of producing single-walled carbon nanotubes utilizes temperatures including a first temperature that can be greater than about 900° C., and a second temperature that can be no greater than about 560° C.

The presently taught nanotube-producing catalyst composition can be an Fe and Mo-containing catalyst composition supported on alumina. This catalyst composition can have a molar ratio of Fe:Mo:$Al_2O_3$ of about 1:0.2:15. In some embodiments of the present method the endothermic carbon-containing feedstock can include, for instance, one or more of carbon monoxide, methane, methanol, ethanol, butane, and hexane.

The reducing atmosphere utilized in the present method can be a hydrogen-containing gas. Additionally, the method can include a further step of decomposing the endothermic carbon-containing feedstock prior to contacting with the nanotube-producing catalyst composition. In some cases, this decomposition can be achieved by contacting the endothermic carbon-containing feedstock with a plasma source prior to contacting the endothermic carbon-containing feedstock with the nanotube-producing catalyst composition, and having the contact be of sufficient duration such that the plasma decomposes the endothermic carbon-containing feedstock.

Also disclosed by the present disclosure is a method of producing single-walled carbon nanotubes by providing an Fe and Mo-containing catalyst composition supported on alumina and a reducing atmosphere, which is then contacted with the Fe and Mo-containing catalyst composition supported on alumina, and both are heated to a first temperature. The Fe and Mo-containing catalyst composition supported on alumina is then cooled to a second temperature, which is no greater than about 560° C. An endothermic carbon-containing feedstock is then provided and contacted with the Fe and Mo-containing catalyst composition supported on alumina, and single-walled carbon nanotubes are produced.

A suitable Fe and Mo-containing catalyst composition supported on alumina can have the Fe and Mo present in a molar ratio of about 5:1, in other embodiments, a suitable Fe and Mo-containing catalyst composition can include Fe and Mo present in molar ratios ranging from about 1:1 to about 10:1. Also, in some embodiments of the presently disclosed method, the first temperature can be a temperature greater than about 900° C. The present method, in some cases, should have the time and temperature conditions during the contacting of the Fe and Mo-containing catalyst with the reducing atmosphere of sufficient duration and heat that any iron oxide present in the catalyst is fully reduced to the metal state, and that any residual oxygen is also removed or reduced from the catalyst composition. As discussed herein, the presence of a significant amount of residual oxygen apparently has an impact on the SWCNT growth conditions.

For the presently disclosed method of producing single-walled carbon nanotubes, the endothermic carbon-containing feedstock can include methane. The reducing atmosphere utilized in the present methods can include a hydrogen-containing gas.

As disclosed above, one of the three theoretical stages of catalytic growth of SWCNT is the decomposition of the endothermic carbon-containing feedstock prior to contacting with the catalyst. In some embodiments of the present methods, the decomposition can be accomplished by contacting the endothermic carbon-containing feedstock with a plasma source prior to contacting the feedstock with the catalyst composition. Here, the plasma exposure conditions can be such that the endothermic carbon-containing feedstock is substantially decomposed.

As used herein, "endothermic carbon-containing feedstock" or similar terms refer to any carbon and hydrogen-containing composition which undergoes an endothermic decomposition reaction to C and $H_2$, while "exothermic carbon-containing feedstock" or similar terms refer to any carbon and hydrogen-containing composition which undergoes an exothermic decomposition reaction to C and $H_2$.

The TPR curve obtained for the presently disclosed Fe:Mo:$Al_2O_3$ catalyst (FIG. 1) shows several reduction peaks. The features observed below 500° C. are similar to those observed for monometallic Fe oxide catalyst supported on alumina, which have been related to the three phases of reduction of iron oxide in the form of hematite to metallic Fe (transformation of $Fe_2O_3 \rightarrow Fe_3O_4 \rightarrow FeO \rightarrow Fe$). (Lobree, L. J.; Hwang, I-C.; Reimer, J. A.; Bell, A. T. *J. Catal.* 1999, 186, 242) The high temperature peak at about 830° C. could be related to residual oxygen in the smaller metal particles (Köhn, R.; Paneva, D.; Dimitrov, M.; Tsoncheva, T.; Mitov, I.; Minchev, C.; Fröba, M. *Micropor. Mesopor. Mater.* 2003, 63, 125) and the effect of Mo, shows that the common reduction procedure (Shajahan, Md.; Mo, Y. H.; Fazle Kibria, A. K. M.; Kim, M. J.; Nahm, K. S. *Carbon* 2004, 42, 2245 and Herrera, J. E.; Balzano, L.; Borgna, A.; Alvarez, W. E.; Resasco, D. E. *J. Catal.* 2001, 204, 129) at about 500° C. under a flow of He/$H_2$ is not enough to completely reduce the metal catalyst in the sample. Moreover, the trend of the curve shows that there might be even more residual oxide that reduces at temperatures higher than 1000° C.

Figure 2:
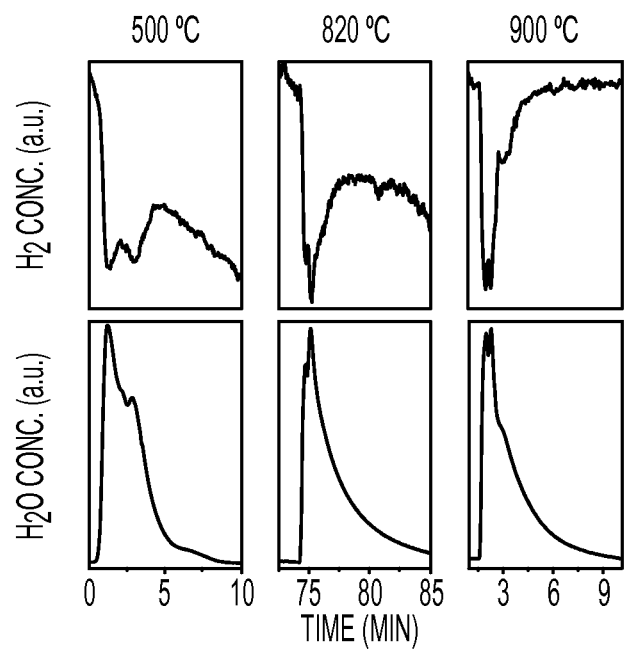
FIG. 2 is a graph of $H_2$ consumption and $H_2O$ formation, obtained with a mass spectrometer, over time.

This result is supported by the in situ MS experiments during catalyst reduction at 500, 820 and 900° C. (FIG. 2), where $H_2$ consumption and corresponding $H_2O$ formation are observed in each case. Without being limited by our present theory, the difficulty in reducing the iron oxide based particles is believed to be related to the path through which the reduction process occurs. We propose that during $H_2$ reduction, a very rapid nucleation occurs when $H_2$ first reaches the surface layer of oxide, forming a thin and dense layer of pure metal, which decreases the reaction interface area and slows down the reduction process. (Pineau, A.; Kanari, N.; Gaballah, I. *Thermochimica Acta* 2006, 447, 89) Because the ratio of surface/volume atoms in such small particles (about 1-2 nm) is high, increasing the reduction temperature in turn increases the fluctuations of the surface atoms, and thereby, improves the accessibility of the $H_2$ molecules to the next internal oxide layer.

It is also theorized that the presence of a significant amount of residual oxygen in the catalyst after common low temperature reduction, such as about 500° C., may have a huge impact on the SWCNT growth. In fact, it has been demonstrated for Fe that the inactivity of the oxide catalyst for growing SWCNTs at about 680° C. can be reversed after undergoing reduction at 500° C. for relatively longer periods of time, such as 10 to 20 hours. See Harutyunyan, A. R.; Pradhan, B. K.; Kim, U. J.; Chen, G.; Eklund, P. C. *Nano Lett.* 2002, 2, 525. Additionally, others have shown that metals like Cu, Au, Pd or Pt, which initially were considered not active for nanotube growth, can indeed nucleate SWCNTs after undergoing a reduction treatment at about 850° C. (Takagi, D.; Homma, Y.; Hibino, H.; Suzuki, S.; Kobayashi, Y. *Nano Lett.* 2006, 6, 2639 and Bhaviripudi, S.; Mile, E.; Steiner III, S. A.; Zare, A. T.; Dresselhaus, M. S.; Belcher, A. M.; Kong, J. *J. Am. Chem. Soc.* 2007, 129, 1516.)

Figure 3:
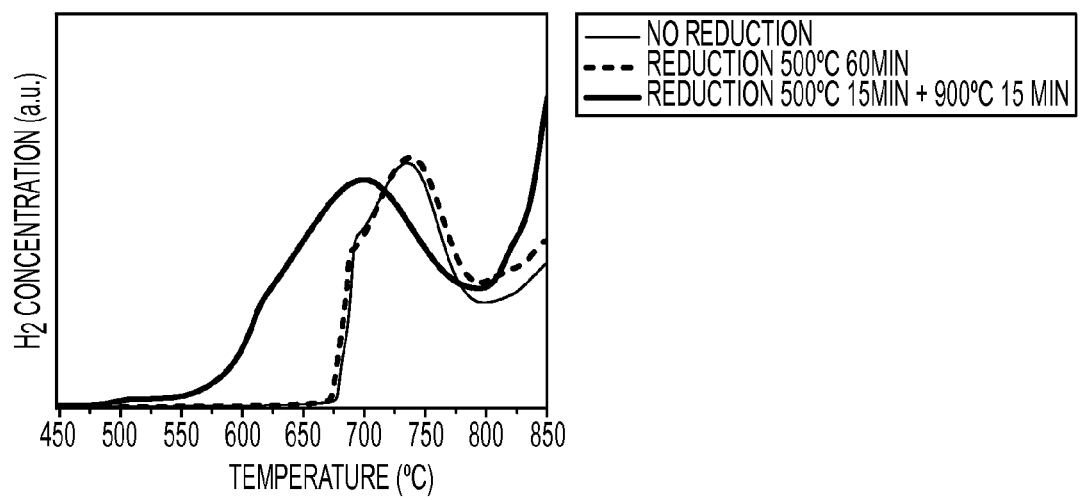
FIG. 3 is a graph of the evolution of $H_2$ concentration over temperature.

In order to investigate the effect of the reduction temperature on the SWCNT synthesis, the effect of reduction temperature on catalytic activity was examined. FIG. 3 shows the dependence of the catalyst activity for $CH_4$ decomposition as a function of the temperature with and without reductive treatment of the catalyst. Here, no apparent difference is observed between the curves of catalysts both reduced at 500° C. for 60 minutes and unreduced, with these results being in agreement with previously reported results for a similar catalyst. (See Harutyunyan et al. above.) However, when the catalyst was additionally reduced at 900° C. for 15 minutes, according to the presently disclosed method, a decrease of about 150° C. in the onset temperature for decomposition of the hydrocarbon gas was observed. This result can be attributed to a decrease in the activation energy for the catalytic decomposition of the $CH_4$. Further increasing of the reduction temperature to about 970° C. did not further decrease this decomposition temperature; the results from 970° C. reduction conditions are not shown.

Figure 4:
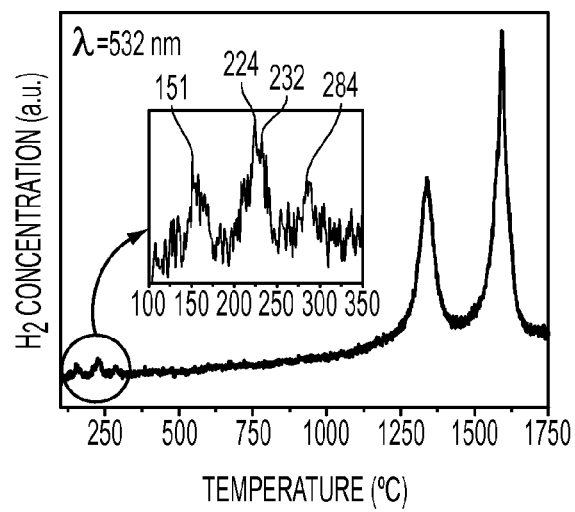
FIG. 4 is the Raman spectrum of SWCNTs grown at 560° C.

The results show that the level of reduction of the sample can greatly affects the catalyst's ability to decompose $CH_4$. The decrease in the temperature at which the decomposition of $CH_4$ gas starts on a catalyst, after undergoing high temperature, about 900° C., reduction, allowed growth of SWCNTs at temperatures as low as about 560° C. The Raman radial breathing modes show a relatively broad diameter distribution (0.7-2 nm) of grown SWCNTs (FIG. 4). The ratio of the intensities of the G and D-bands is low, as expected and is attributed to the level of graphitization of the samples which should be low due to the reduced synthesis temperature according to the presently disclosed method.

To our knowledge, the presently disclosed method results in the lowest reported temperature for the growth of SWCNTs with this catalyst composition and with $CH_4$ as the carbon source via thermal CVD. Previously reported minimum SWCNT growth temperatures with Fe:Mo catalyst were around 680° C., (See Harutyunyan et al. above, and Hornyak, G. L.; Grigorian, L.; Dillon, A. C.; Parilla, P. A.; Jones, K. M.; Heben, M. J. *J Phys Chem B* 2002, 106, 2821) where the catalyst was unreduced or submitted to a reduction pretreatment at 500° C. (10% $H_2$ in He for 10-20 hours). Using a Ni catalyst and $CH_4$, a SWCNT growth temperature of about 600° C. was reported, (Seidel, R.; Duesberg G. S.; Unger, E.; Graham, A. P.; Liebau, M.; Kreupl, F. *J. Phys. Chem B* 2004, 108, 1888) although the authors mentioned that a $H_2$ pretreatment at 650° C. was crucial to enable SWCNT growth at such a low temperature.

The above analysis clearly shows that under the presently disclosed methods, once the endothermic carbon feedstock decomposition begins, the SWCNT growth can also begin. Low temperature SWCNT growth appears to be limited by the feedstock decomposition process. The SWCNT growth temperature when using endothermic feedstock, $CH_4$, is still higher than that observed when exothermic carbon feedstocks are used. Thus, it is reasonable to suggest that the threshold temperature $T_g$ for incorporating C into the SWCNT wall must be lower than the recently reported low SWCNT growth temperature. (See Cantoro et al. above.) Moreover, since the defect healing involved in the formation of good quality SWCNT requires a higher temperature, and incorporating carbon into the tube wall is an exothermic process, at least, as observed experimentally, SWCNT of rather low quality often emerge at reduced growth temperatures.

The present disclosure also suggests that by using more active carbon feedstock or somehow facilitating its decomposition, for example, with plasma exposure, one can enable the synthesis of SWCNT at even lower temperatures, for example, at about 300° C. The low levels of $T_{diff}$ and $T_g$ make the effort in this direction more promising. Another encouraging fact is that multi-wall CNTs can be synthesized at much lower temperature (for instance, at about 175° C. with $CCl_4$ as feedstock, see Vohs, J. K.; Brege, J. J.; Raymond, J. E.; Brown, A. E.; Williams, G. L.; Fahlman, B. D. *J. Am. Chem. Soc.* 2004, 126, 9936.)

Figure 5:
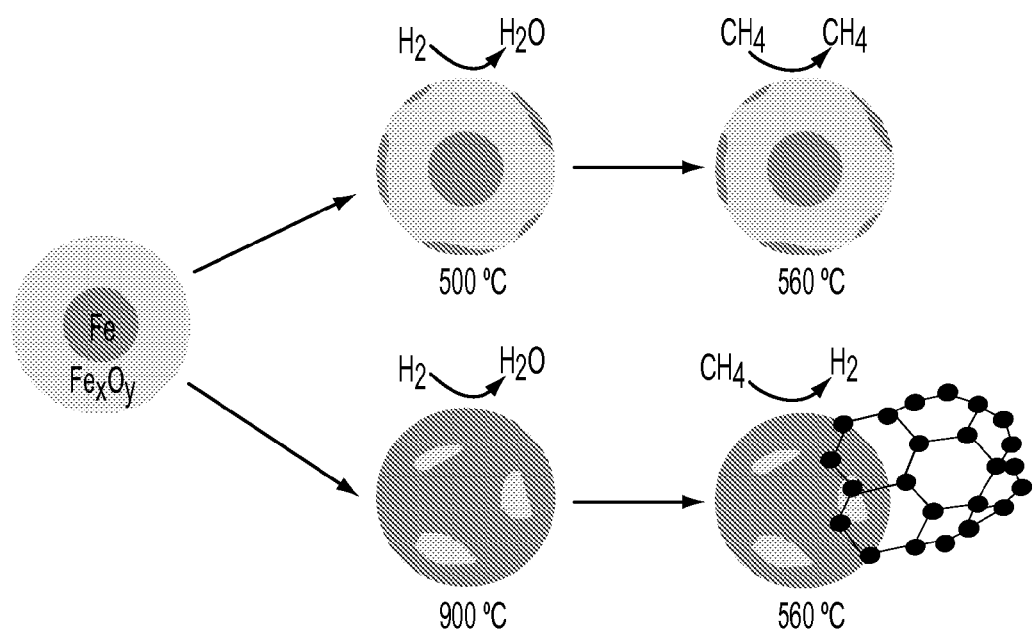
FIG. 5 is a schematic representation of nanotube growth over an activated alumina-supported Fe-containing catalyst.

The process of the growth of SWCNT over the activated Fe:Mo:$Al_2O_3$ catalyst according to the present disclosure is represented schematically in FIG. 5. The relative amounts of Fe available after catalyst reduction treatments at 500° C. and 900° C. are shown with the increased amount of Fe represented by the darker regions. The low temperature growth of SWCNT from $CH_4$ is illustrated as occurring at the catalyst treated at the higher temperature.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Experimental

Samples of Fe:Mo catalyst supported on $Al_2O_3$ powder (molar ratio Fe:Mo:$Al_2O_3$ of 1:0.2:15) were prepared by a previously developed impregnation method. (See Harutyunyan et al. above.)

The catalyst reducibility was studied by temperature programmed reduction (TPR) in a Micromeritics Autochem 2910 under a flow of 10% $H_2$ in Ar (total gas flow of 50 sccm).

These results are presented in FIG. 1.

SWCNTs were grown by fast heating CVD using 50% $CH_4$ (Praxair, 99.999% purity) diluted in Ar as the carbon source with a total gas flow rate of 80 sccm. The catalyst was packed on a quartz capsule and positioned perpendicular to the gas flow ensuring that all gases passed through the catalyst with substantially complete and similar accessibility. A mass spectrometer (MS), attached at the gas outlet of the reactor, monitored in situ the catalyst activity during the experiments by following the $H_2$ formation ($CH_4 \rightarrow C + 2H_2$, $\Delta H° = +89.0$ kJ/mol at 800° C.).

Prior to the synthesis step, the catalyst was reduced under a flowing $H_2$/He gas mixture (40 sccm/100 sccm) for various combinations of time and temperature, including for about 15 minutes at temperatures ranging from about 500° C. to about 900° C. The carbonaceous samples obtained were then characterized by Raman scattering analysis. The Raman spectrum is presented in FIG. 4.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated.

What we claim is:

1. A method of producing single-walled carbon nanotubes comprising:
   providing a nanotube-producing catalyst composition;
   providing a reducing atmosphere;
   contacting the nanotube-producing catalyst composition with the reducing atmosphere;
   heating the nanotube-producing catalyst composition and the reducing atmosphere to a first temperature between 820° C. and 900° C.;
   cooling the nanotube-producing catalyst composition to a second temperature no greater than 560° C.;
   providing an endothermic carbon-containing feedstock;
   contacting the endothermic carbon-containing feedstock with the nanotube-producing catalyst composition, and
   producing single-walled carbon nanotubes.

2. The method of producing single-walled carbon nanotubes according to claim 1, wherein the nanotube-producing catalyst composition comprises an Fe and Mo-containing catalyst composition supported on alumina.

3. The method of producing single-walled carbon nanotubes according to claim 1, wherein the endothermic carbon-containing feedstock comprises at least one member selected from the group consisting of carbon monoxide, methane, methanol, ethanol, butane, and hexane.

4. The method of producing single-walled carbon nanotubes according to claim 1, wherein the endothermic carbon-containing feedstock comprises methane.

5. The method of producing single-walled carbon nanotubes according to claim 1, wherein the reducing atmosphere comprises a hydrogen-containing gas.

6. The method of producing single-walled carbon nanotubes according to claim 1, further comprising:
   decomposing the endothermic carbon-containing feedstock prior to contacting with the nanotube-producing catalyst composition.

7. The method of producing single-walled carbon nanotubes according to claim 1, further comprising:
   contacting the endothermic carbon-containing feedstock with a plasma source prior to contacting the endothermic carbon-containing feedstock with the nanotube-producing catalyst composition,
   wherein the plasma decomposes the endothermic carbon-containing feedstock.

8. A method of producing single-walled carbon nanotubes comprising:
   providing an Fe and Mo-containing catalyst composition supported on alumina;
   providing a reducing atmosphere;
   contacting the Fe and Mo-containing catalyst composition supported on alumina with the reducing atmosphere;
   heating the Fe and Mo-containing catalyst composition supported on alumina and the reducing atmosphere to a first temperature between 820° C. and 900° C.;
   cooling the Fe and Mo-containing catalyst composition supported on alumina to a second temperature no greater than 560° C.;
   providing an endothermic carbon-containing feedstock;
   contacting the endothermic carbon-containing feedstock with the Fe and Mo-containing catalyst composition supported on alumina, and
   producing single-walled carbon nanotubes.

9. The method of producing single-walled carbon nanotubes according to claim 8, wherein the Fe and Mo-containing catalyst composition supported on alumina comprises Fe and Mo in a molar ratio of about 5:1.

10. The method of producing single-walled carbon nanotubes according to claim 8, wherein the endothermic carbon-containing feedstock comprises at least one member selected from the group consisting of carbon monoxide, methane, methanol, ethanol, butane, and hexane.

11. The method of producing single-walled carbon nanotubes according to claim 8, wherein the endothermic carbon-containing feedstock comprises methane.

12. The method of producing single-walled carbon nanotubes according to claim 8, wherein the reducing atmosphere comprises a hydrogen-containing gas.

13. The method of producing single-walled carbon nanotubes according to claim 8, further comprising:
   decomposing the endothermic carbon-containing feedstock prior to contacting with the Fe and Mo-containing catalyst composition supported on alumina.

14. The method of producing single-walled carbon nanotubes according to claim 8, further comprising:
   contacting the endothermic carbon-containing feedstock with a plasma source prior to contacting the endothermic carbon-containing feedstock with the Fe and Mo-containing catalyst composition supported on alumina,
   wherein the plasma decomposes the endothermic carbon-containing feedstock.

15. A method of conditioning catalysts to produce single-walled carbon nanotubes comprising:
   providing an Fe and Mo-containing catalyst composition supported on alumina;
   providing a reducing atmosphere;
   contacting the Fe and Mo-containing catalyst composition supported on alumina with the reducing atmosphere;
   heating the Fe and Mo-containing catalyst composition supported on alumina and the reducing atmosphere to a first temperature for a time sufficient to thereby fully reduce the Fe and Mo-containing catalyst composition to the metal state and remove substantially all residual oxygen initially present in the catalyst;

cooling the Fe and Mo-containing catalyst composition supported on alumina to a second temperature no greater than 560° C.;

providing a methane-containing feedstock;

contacting the methane-containing feedstock with a plasma source prior to contacting the methane-containing feedstock with the Fe and Mo-containing catalyst composition wherein the plasma decomposes the methane-containing feedstock, contacting the methane-containing feedstock with the Fe and Mo-containing catalyst composition supported on alumina, and producing single-walled carbon nanotubes.

16. A method of conditioning catalysts to produce single-walled carbon nanotubes comprising:

providing an Fe and Mo-containing catalyst composition supported on alumina;

providing a reducing atmosphere;

contacting the Fe and Mo-containing catalyst composition supported on alumina with the reducing atmosphere;

heating the Fe and Mo-containing catalyst composition supported on alumina and the reducing atmosphere to a first temperature ranging from between 820° C. to 900° C. for a time sufficient to thereby fully reduce the Fe and Mo-containing catalyst composition to the metal state and remove substantially all residual oxygen initially present in the catalyst;

cooling the Fe and Mo-containing catalyst composition supported on alumina to a second temperature no greater than 560° C.;

providing a methane-containing feedstock;

contacting the methane-containing feedstock with the Fe and Mo-containing catalyst composition supported on alumina, and producing single-walled carbon nanotubes.

\* \* \* \* \*